(12) United States Patent
Osawa

(10) Patent No.: US 10,574,156 B2
(45) Date of Patent: Feb. 25, 2020

(54) VIBRATION TYPE ACTUATOR, LENS DRIVING DEVICE, AND ULTRASONIC MOTOR

(71) Applicant: CANON KABUSHIKI KAISHA, Tokyo (JP)

(72) Inventor: Kazuharu Osawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 15/562,679

(22) PCT Filed: Jun. 10, 2016

(86) PCT No.: PCT/JP2016/002807
§ 371 (c)(1),
(2) Date: Sep. 28, 2017

(87) PCT Pub. No.: WO2016/203745
PCT Pub. Date: Dec. 22, 2016

(65) Prior Publication Data
US 2018/0097459 A1    Apr. 5, 2018

(30) Foreign Application Priority Data
Jun. 17, 2015    (JP) ................................. 2015-122190

(51) Int. Cl.
*H02N 2/04*    (2006.01)
*H02N 2/00*    (2006.01)
*H02N 2/02*    (2006.01)

(52) U.S. Cl.
CPC ............. *H02N 2/04* (2013.01); *H02N 2/0015* (2013.01); *H02N 2/0065* (2013.01); *H02N 2/026* (2013.01)

(58) Field of Classification Search
CPC ...... H02N 2/04; H02N 2/0015; H02N 2/0065; H02N 2/026; H02N 2/001; H02N 2/0005; H02N 2/004; H02N 2/005; H02N 2/0055
(Continued)

(56) References Cited

U.S. PATENT DOCUMENTS 7,348,693 B2 * 3/2008 Sasaki .................... G02B 15/14
310/323.02
7,449,802 B2 11/2008 Sasaki et al.
(Continued)

FOREIGN PATENT DOCUMENTS

| JP | 07-107758 A | 4/1995 |
| JP | 2005-057838 A | 3/2005 |
| JP | 2014-093872 A | 5/2014 |

OTHER PUBLICATIONS

Extended European Search Report dated Jan. 23, 2019, in European Patent Application No. 16811220.9.
(Continued)

*Primary Examiner* — Derek J Rosenau
(74) *Attorney, Agent, or Firm* — Venable LLP

(57) ABSTRACT

A vibration type actuator includes a first member that has a vibrator; a second member that extends in a predetermined direction and has a friction sliding surface where the vibrator is press-contacted; a third member that rotatably holds the second member with respect to an axis parallel to the predetermined direction; and a pressing unit that generates a first force for rotating the second member with respect to the axis relative to the third member. The first member is sandwiched between the second member and the third member by the first force. The first member is driven in a driving direction parallel to the predetermined direction relative to the second member by the vibration of the vibrator.

9 Claims, 9 Drawing Sheets

(58) Field of Classification Search
USPC .................................. 310/323.01–323.21
See application file for complete search history.

(56) References Cited

U.S. PATENT DOCUMENTS

| | | |
|---|---|---|
| 2006/0232168 A1 | 10/2006 | Konishi et al. |
| 2010/0141091 A1* | 6/2010 | Sakamoto .............. H02N 2/004 310/323.16 |
| 2015/0137663 A1 | 5/2015 | Kimura et al. |
| 2016/0126449 A1 | 5/2016 | Osawa et al. |

OTHER PUBLICATIONS

International Search Report dated Sep. 13, 2016 in International Application No. PCT/JP2016/002807.

* cited by examiner

[Fig. 1A]
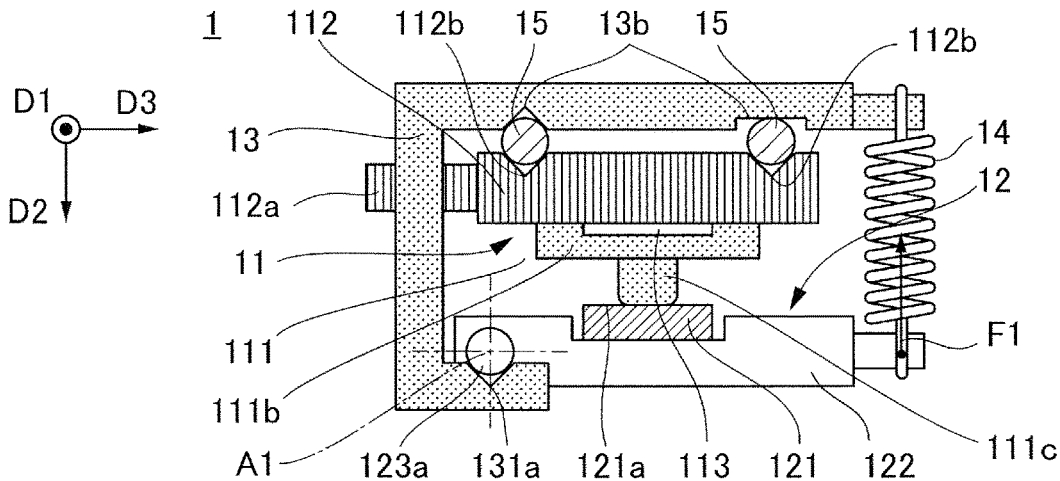
[Fig. 1B]
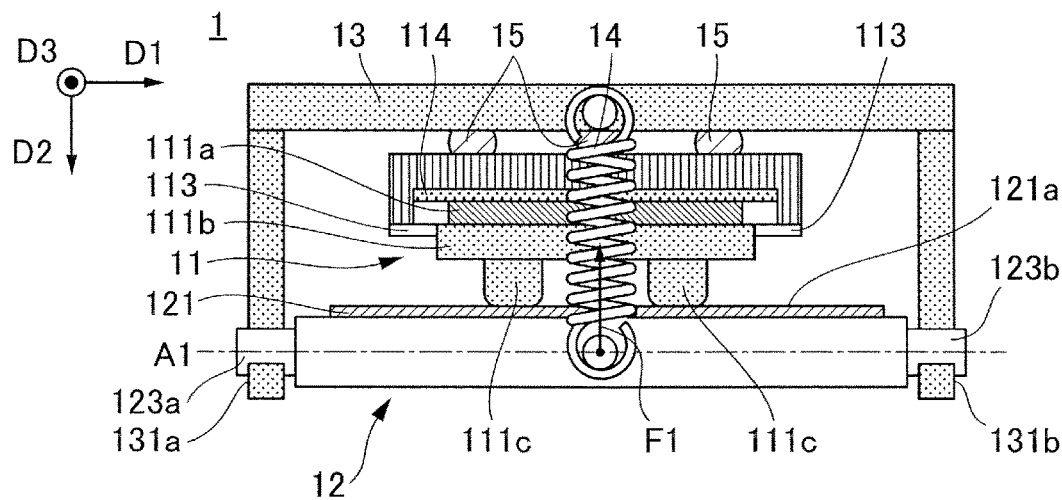
[Fig. 1C]
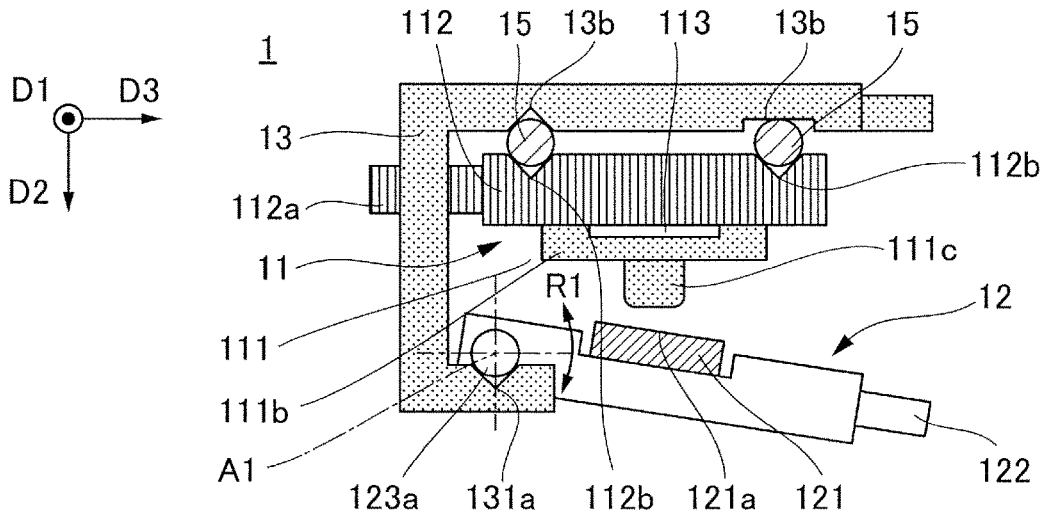

[Fig. 2A]
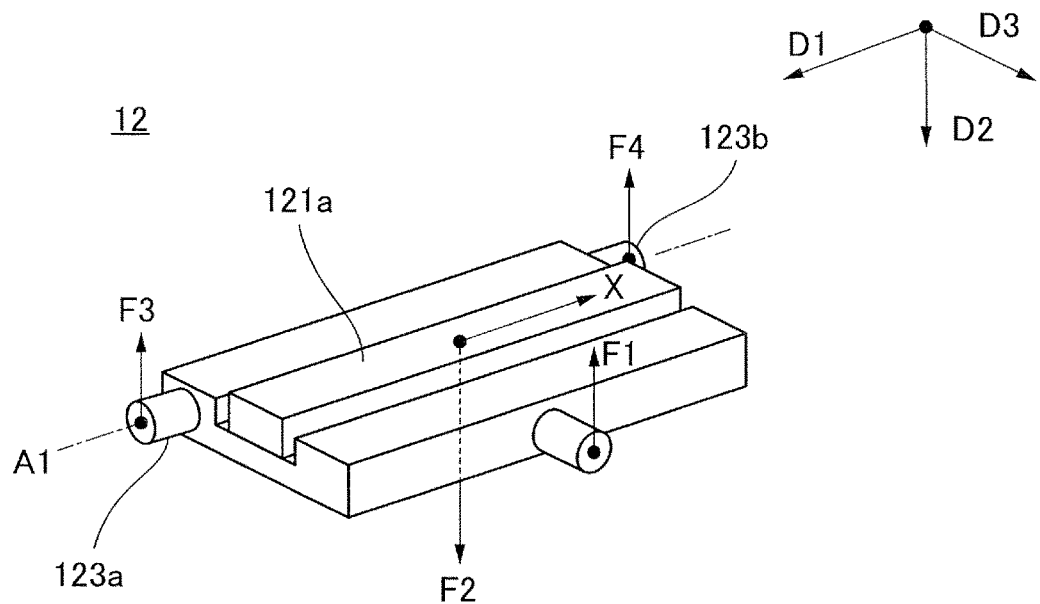
[Fig. 2B]
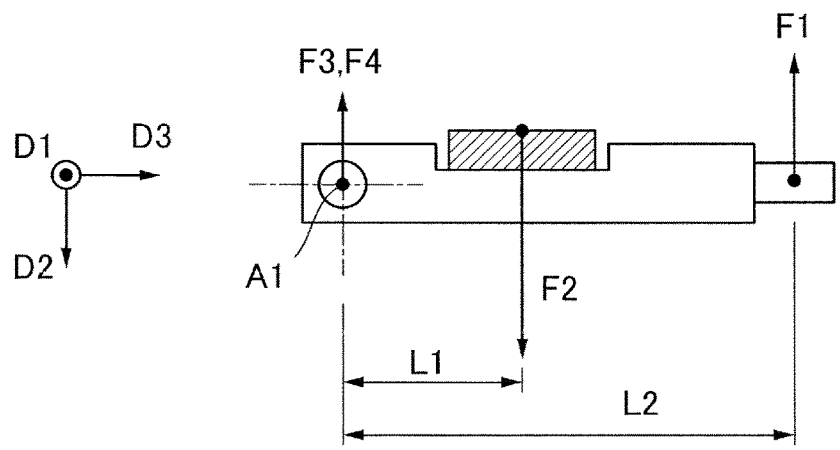
[Fig. 2C]
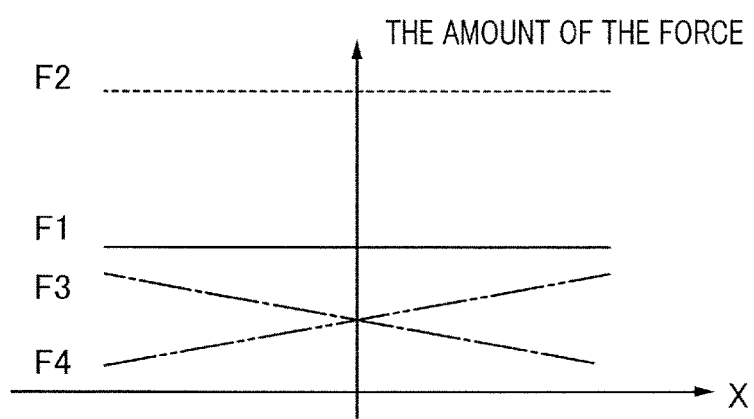

[Fig. 3A]
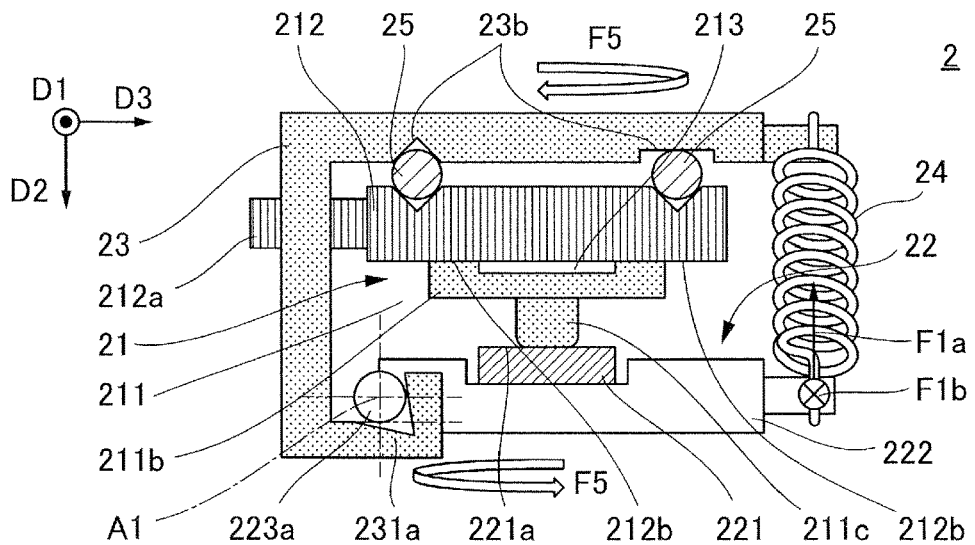
[Fig. 3B]
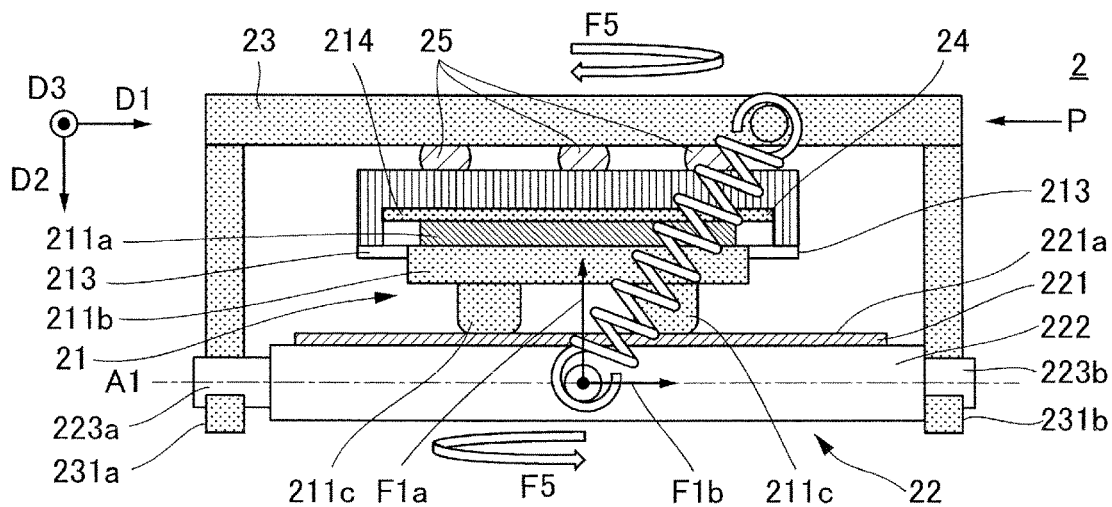
[Fig. 3C]
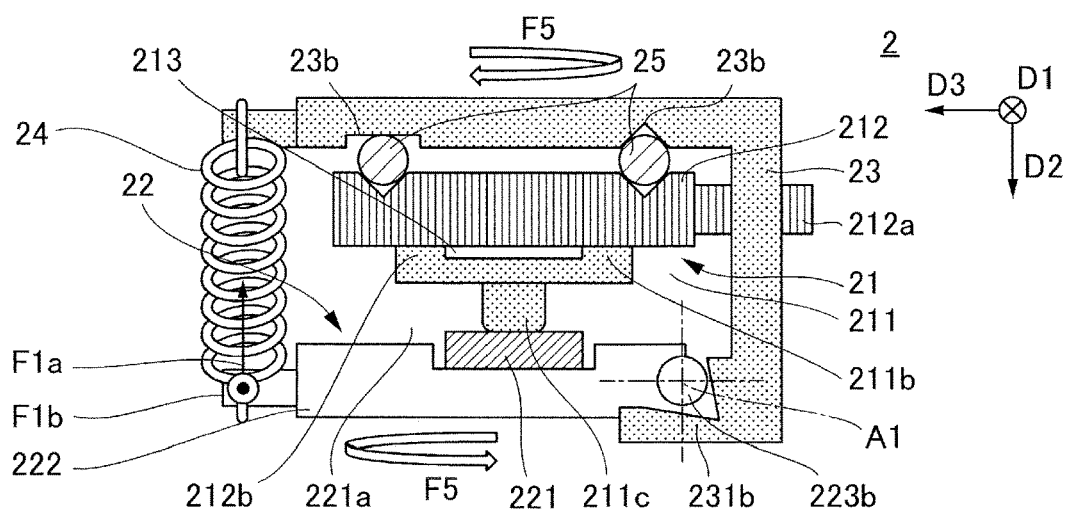

[Fig. 4A]
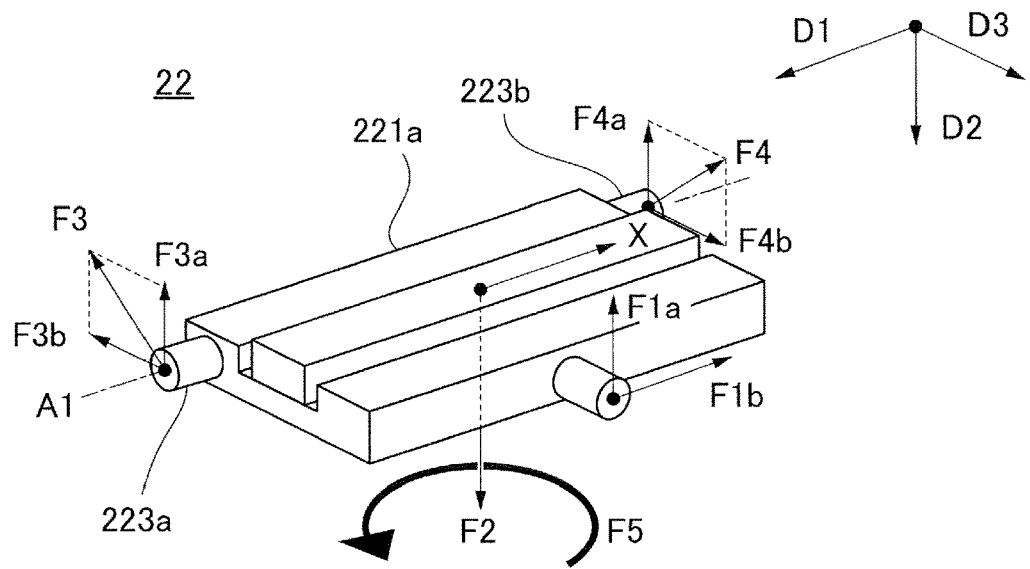
[Fig. 4B]
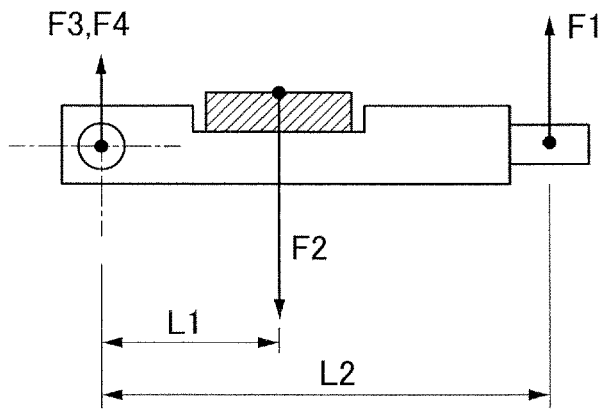
[Fig. 4C]
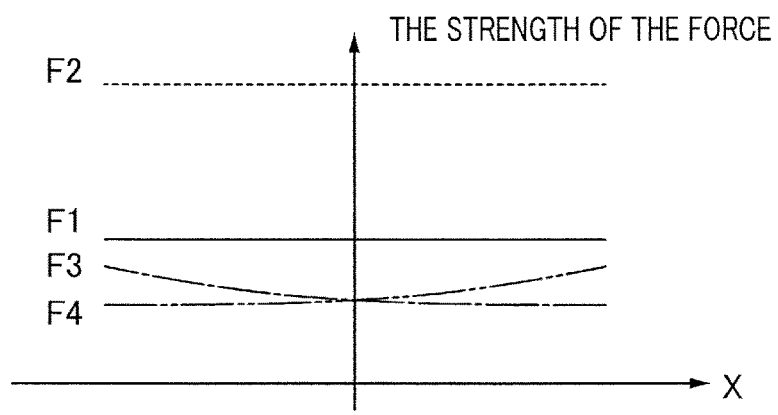

[Fig. 5A]
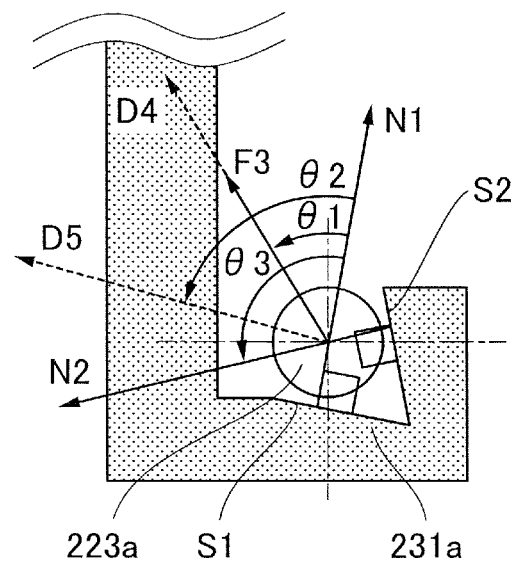
[Fig. 5B]
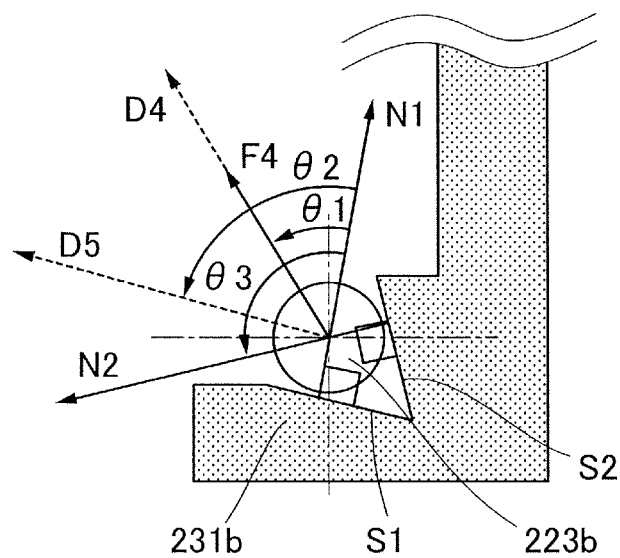

[Fig. 5C]
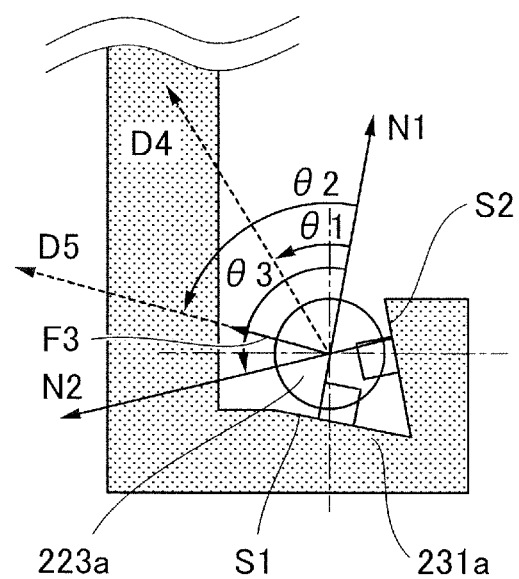
[Fig. 5D]
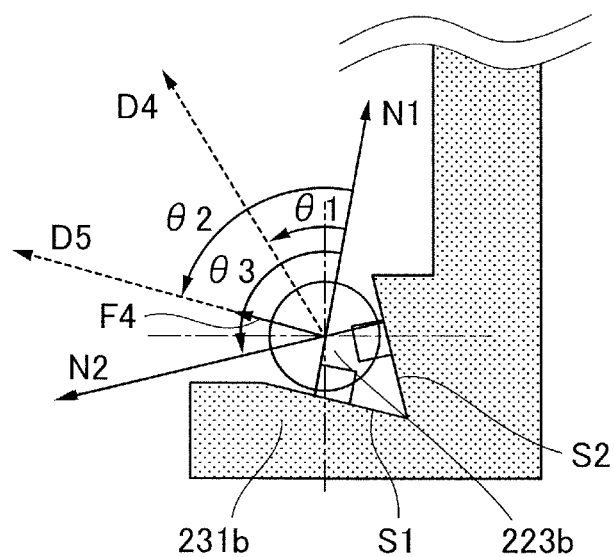

[Fig. 6A]
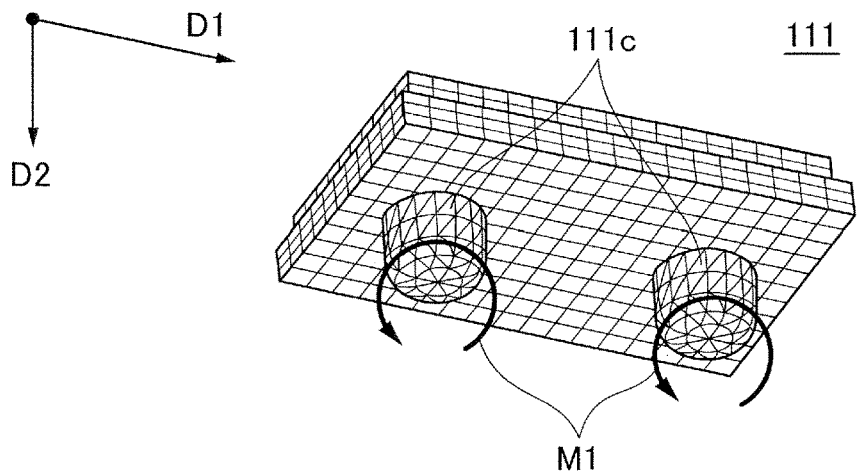
[Fig. 6B]
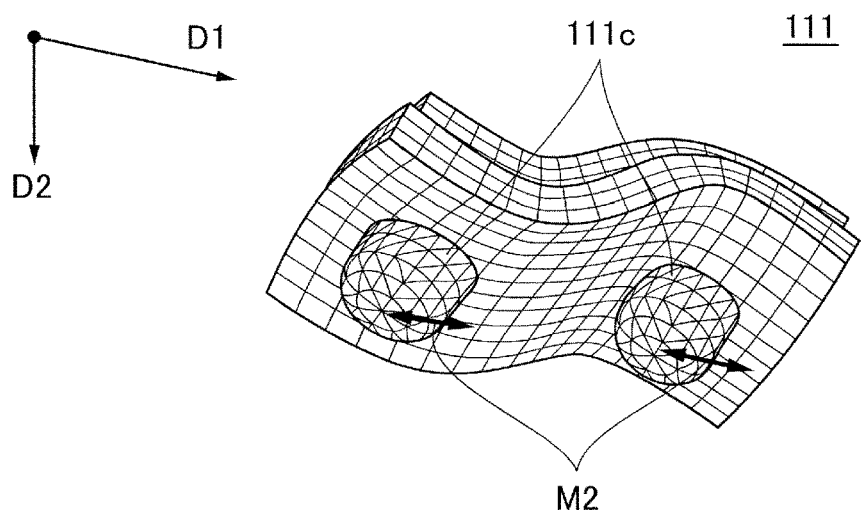
[Fig. 6C]
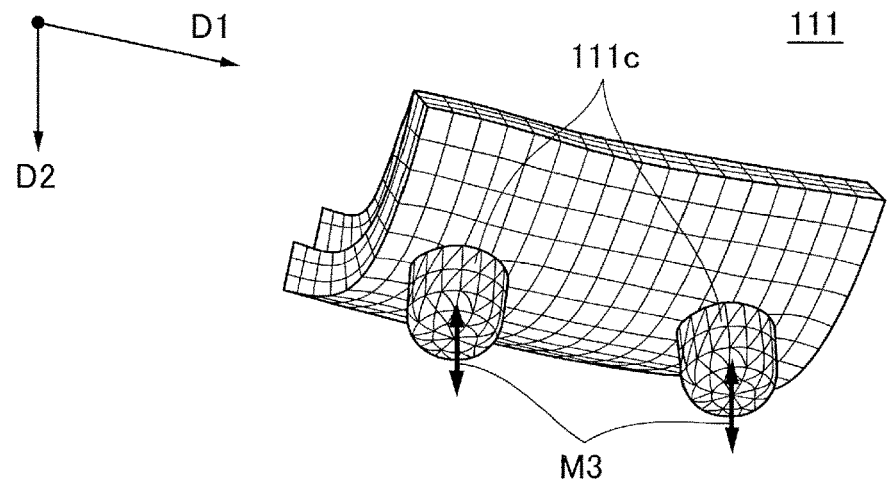

[Fig. 7]
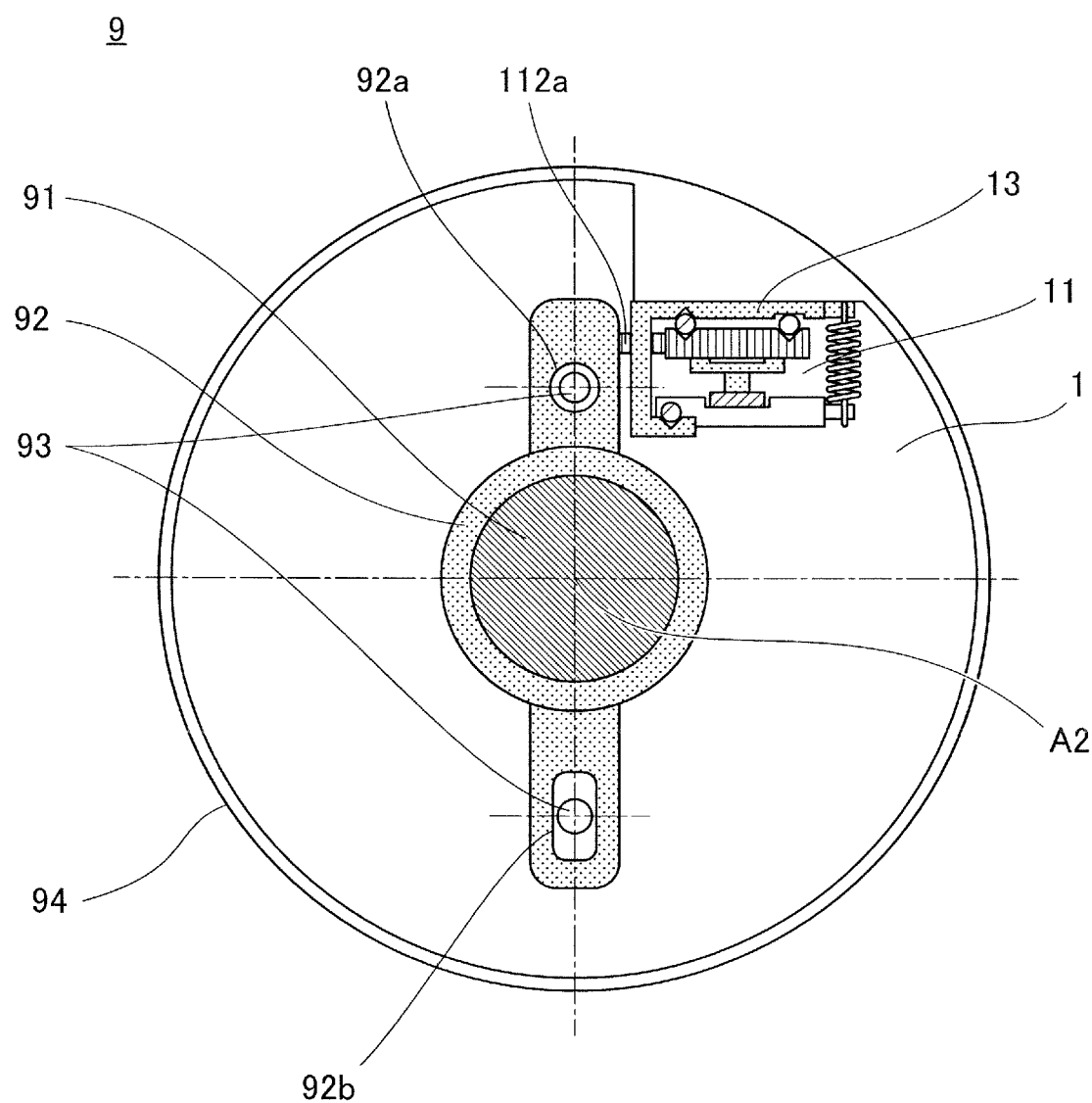

[Fig. 8A]
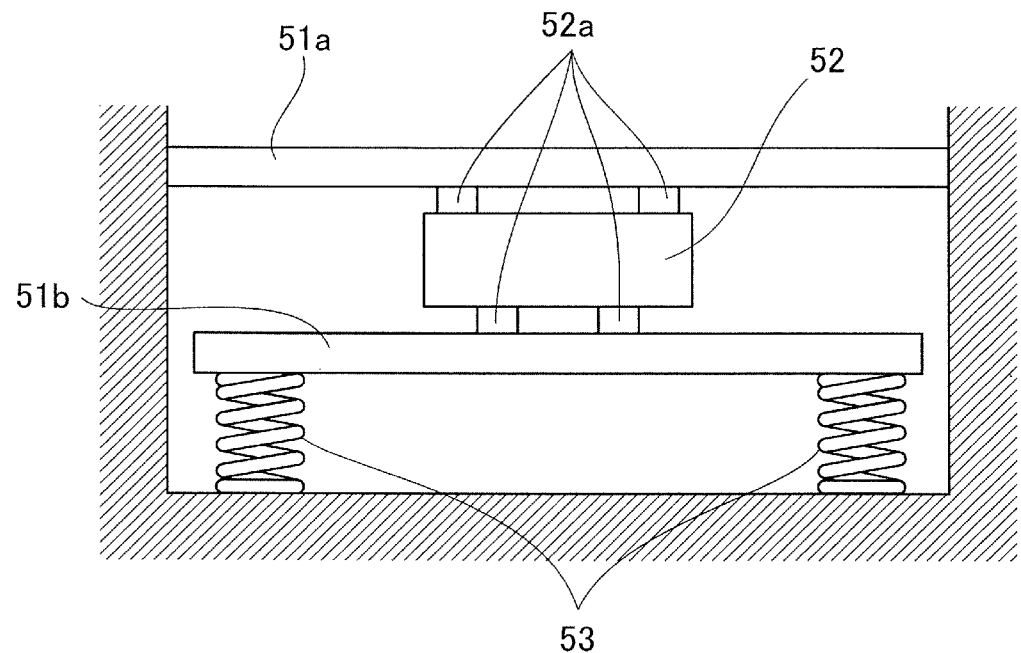
[Fig. 8B]
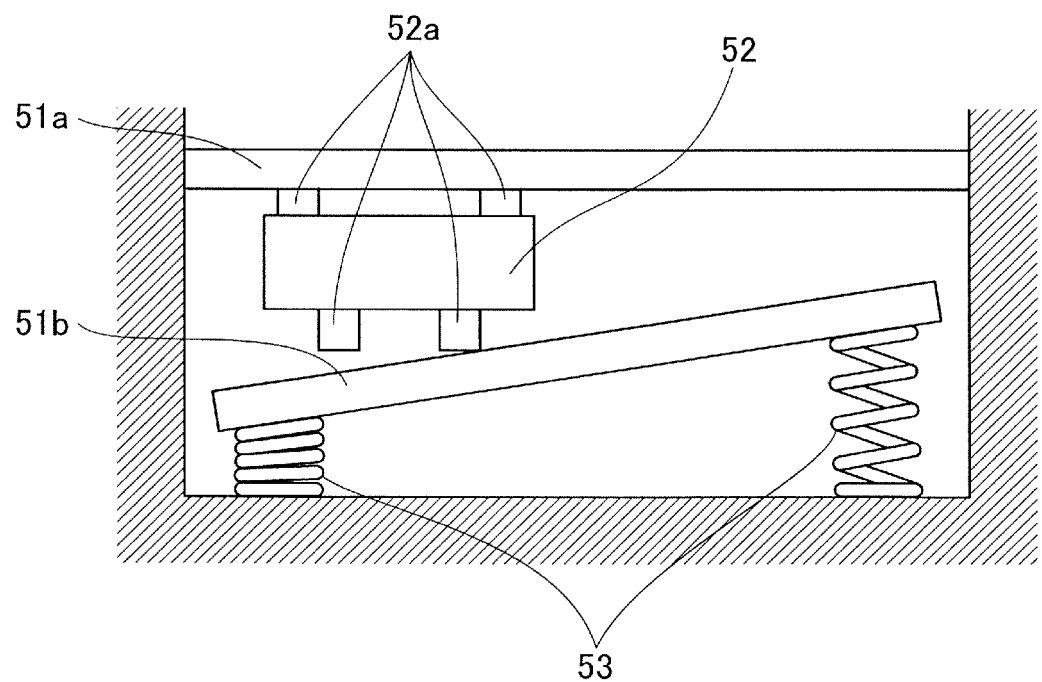

VIBRATION TYPE ACTUATOR, LENS DRIVING DEVICE, AND ULTRASONIC MOTOR

TECHNICAL FIELD

The invention relates to a vibration type actuator, a lens driving device, and an ultrasonic motor.

BACKGROUND ART

A vibration type actuator utilizing a vibration of a piezoelectric element is small and generates a high driving force. Therefore, the vibration type actuator is compatible with a wide speed range and has low vibration and low noise. A vibration type actuator is known that employs a method for simultaneously exciting a plurality of resonant modes on a chip-type vibrator on which a projection is provided. The vibration type actuator causes an elliptical motion to the projection of the vibrator, and a friction member that is press-contacted with the projection is relatively driven by a friction force. The feature of the vibration type actuator is that the vibrator is relatively small and an object to be driven can be directly linear-driven.

Patent Literature 1 discloses the vibration type motor for linearly driving the object to be driven that uses the chip-type vibrator. The vibration type motor using such a chip-type vibrator is used as, for example, a lens driving actuator in a lens barrel of a camera, which is small and requires high linear driving force.

CITATION LIST

Patent Literature

PTL1 1: Japanese Patent Laid-Open No. 2005-57838

In the conventional vibration type actuator, if the vibrator moves a large stroke amount, the friction member is tilted and the applied pressure of the vibrator and the friction member is unstable. Therefore, the driving characteristic of the vibration type actuator is not stable.

SUMMARY OF INVENTION

The present invention provides a vibration type actuator having a stable driving characteristic even if a vibrator moves a large stroke amount.

A vibration type actuator according to the present invention comprises a first member that has a vibrator; a second member that extends in a predetermined direction and has a friction sliding surface where the vibrator is press-contacted; a third member that rotatably holds the second member with respect to an axis parallel to the predetermined direction; and a pressing unit that generates a first force for rotating the second member with respect to the axis relative to the third member, wherein the first member is sandwiched between the second member and the third member by the first force, and wherein the first member is driven in a driving direction parallel to the predetermined direction relative to the second member by the vibration of the vibrator.

According to the present invention, even if the vibrator moves in the large stroke amount, the vibration type actuator having stable driving characteristics can be provided.

Further features of the invention will become apparent from the following description of exemplary embodiments with reference to the attached drawings.

BRIEF DESCRIPTION OF DRAWINGS

FIG. 1A is a diagram illustrating the configuration of a vibration type actuator.

FIG. 1B is a diagram illustrating the configuration of the vibration type actuator.

FIG. 1C is a diagram illustrating the configuration of the vibration type actuator.

FIG. 2A is a diagram illustrating a force acting in the vibration type actuator.

FIG. 2B is a diagram illustrating the force acting in the vibration type actuator.

FIG. 2C is a diagram illustrating the force acting in the vibration type actuator.

FIG. 3A is a diagram illustrating the configuration of a vibration type actuator.

FIG. 3B is a diagram illustrating the configuration of the vibration type actuator.

FIG. 3C is a diagram illustrating the configuration of the vibration type actuator.

FIG. 4A is a diagram illustrating a force acting in the vibration type actuator.

FIG. 4B is a diagram illustrating the force acting in the vibration type actuator.

FIG. 4C is a diagram illustrating the force acting in the vibration type actuator.

FIG. 5A is a diagram illustrating the holding of a convex portion of a second member by a third member holding unit in a case where an urging force is changed.

FIG. 5B is a diagram illustrating the holding of the convex portion of the second member by the third member holding unit in the case where the urging force is changed.

FIG. 5C is a diagram illustrating the holding of the convex portion of the second member by the third member holding unit in the case where the urging force is changed.

FIG. 5D is a diagram illustrating the holding of the convex portion of the second member by the third member holding unit in the case where the urging force is changed.

FIG. 6A is a diagram illustrating the principle of the generation of a driving force due to a vibration of a vibrator.

FIG. 6B is a diagram illustrating the principle of the generation of the driving force due to the vibration of the vibrator.

FIG. 6C is a diagram illustrating the principle of the generation of the driving force due to the vibration of the vibrator.

FIG. 7 is a diagram viewed from an optical axis direction of a lens of the lens driving device.

FIG. 8A is a diagram illustrating an example of the vibration type actuator on which a pressure configuration for pressing the friction member to the vibrator is applied.

FIG. 8B is a diagram illustrating the example of the vibration type actuator on which the pressure configuration for pressing the friction member to the vibrator is applied.

DESCRIPTION OF EMBODIMENTS

FIGS. 8A and 8B are diagrams illustrating an example of a vibration type actuator on which a pressure configuration for pressing the friction member to the vibrator is applied. A state shown in FIGS. 8A and 8B illustrates the vibration type actuator in the state viewed from the driving direction side of the motor. As shown in FIG. 8A, two friction members 51a and 51b are arranged so as to sandwich a vibrator 52. One friction member 51a is fixed and the other friction member 51b is translatably held parallel to pressure direction. The translatable friction member 51b is pressed by a compression spring 53, and thus the friction members 51a and 51b are pressed by the vibrator 52.

The translatably held friction member 51b is pressed to the vibrator 52 and held by a plurality of projections 52a of the vibrator 52. In the above configuration, as shown in FIG. 8B, if the vibrator 52 moves a large stroke amount, the projections 52a that hold the friction member 51b are moved. Therefore, the friction member 51b is tilted. If the friction member 51b is tilted, the pressing force of the vibrator 52 and the friction member 51 is unstable, and thus there is a problem that the driving characteristic is unstable. According to the vibration type actuator of the present embodiment described below, it is possible to solve the above problems.

First Embodiment

FIGS. 1A to 1C are diagrams illustrating the configuration of a vibration type actuator. A vibration type motor 1 shown in FIGS. 1A to 1C is an ultrasonic motor that functions as the vibration type actuator having a vibrator that ultrasonically vibrates by applying a high frequency voltage. Of course, the applicable scope of the present invention is not limited to the ultrasonic motor. Furthermore, the present invention is applicable to a lens driving device comprising the vibration type motor 1.

FIG. 1A illustrates the state viewed from the driving direction (direction D1 shown in FIGS. 1A to 1C) of the vibration type motor 1. FIG. 1B illustrates the state viewed from the side of the driving direction of the vibration type motor 1. The vibration type motor 1 comprises a first member 11, a second member 2, a third member 13, and a pressing unit 14.

The first member 11 comprises a vibrator 111 vibrated by applying an AC (alternating-current) voltage, a vibrator holding unit 112 that holds the vibrator 111, a connecting unit 113 that connects the vibrator 111 with the vibrator holding unit 112, and a vibrator receiving unit 114. The vibrator is made by a metal plate 111b and a piezoelectric element 111a having a piezoelectric effect such as, for example, PZT (piezoelectric zirconatetitanate). In addition, a projection 111c is provided on the vibrator 111. A power extraction unit 112a, which takes out a power of the vibration type motor 1, is provided on the vibrator holding unit 112.

The connecting unit 113 is formed of, for example, a thin sheet metal and has a low rigidity in a bending direction (direction D2 shown in FIGS. 1A to 1C) of the metal plate and a high rigidity in a tensile direction (direction D1 shown in FIGS. 1A to 1C) of the metal plate. Accordingly, the vibrator 111 is connected with the vibrator holding unit 112 without obstructing the vibration in the direction D2 shown in FIGS. 1A to 1C and without backlash in the direction D1 shown in FIGS. 1A to 1C. The vibrator receiving unit 114 is disposed between the vibrator 111 and the vibrator holding unit 112. A material such as felt, which is difficult to obstruct the vibration, is used for the vibrator receiving unit 114. Thus, the vibrator 111 is held at the specified location without obstructing the vibration of the vibrator 111 when the projection 111c of the vibrator 111 is press-contacted with the friction member.

The second member 12 comprises a friction member 121 and a friction member holding member 122 that holds the friction member 121. A friction sliding surface 121a, which extends in a predetermined direction (the D1 direction shown in FIGS. 1A to 1C) and is press-contacted with the projection 111c of the vibrator 111, is provided on the friction member 121. Shaft shaped convex portions 123a and 123b are provided on the friction member holding member 122.

V groove-shaped holding units 131a and 131b, which hold the convex portions 123a and 123b, are provided on the third member 13. The convex portions 123a and 123b of the second member 12 are urged by the holding units 131a and 131b of the third member 13, and thereby the third member 13 relatively rotatably holds the second member 12 with respect to the axis (A1 axis shown in FIGS. 1A to 1C) parallel to the D1 direction shown in FIGS. 1A to 1C.

The projections may be provided on the third member 13, and the V groove-shaped holding units that hold the projections may be provided on the second member 12. That is, in the vibration type actuator of the present invention, the projection is provided on one of the second member 12 and the third member 13, and the holding unit holding the projection is provided on the other.

FIG. 1C illustrates the first member 11, the second member 12, and the third member 13 in the state viewed from the same direction as FIG. 1A. With the above holding structure, the second member 12 is relatively rotatable to the third member 13 with respect to the axis A1 in shown in FIGS. 1A to 1C as shown in an arrow R1 of FIG. 1C.

A groove that extends in the D1 direction shown in FIGS. 1A to 1C is provided on the third member 13 as a guide portion 13b that rotatably holds the first member 11 in the driving direction. Furthermore, the groove is provided on the first member 11 at a position opposite to the position of the guide portion 13b of the third member 13 as a guided portion 112b. In addition, a rolling ball 15 is sandwiched between the groove of the guide portion 13b and the groove of the guided portion 112b. Therefore, the first member 11 is movably guided only in the direction D1 shown in FIGS. 1A to 1C with respect to the third member 13.

The vibration type motor 1 comprises a tension spring serving as the pressing unit 14 that causes a force (F1 shown in FIGS. 1A to 1C) for rotating the second member 12 to the third member 13 with respect to the axis A1. Hereinafter, the force for rotating the second member 12 with respect to the third member 13 with respect to the A1 axis is referred to as a "first force". The pressing unit 14 press-contacts the projection 111c of the vibrator 111 with the friction sliding surface 121a of the second member 12 by rotating the second member 12 with respect to the axis A1. In this state, a driving force is generated between the projection 111c and the friction sliding surface 121a by the vibration of the vibrator 111, and the first member comprising the vibrator 111 drives in the direction D1 shown in FIGS. 1A to 1C to the second member 12.

FIGS. 6A to 6C are diagrams illustrating the principle of the generation of a driving force due to a vibration of a vibrator. FIG. 6A is a perspective view of the vibrator 111. FIGS. 6B and 6C each illustrate a vibration mode generated in the vibrator 111. In the vibration mode shown in FIG. 6B, a tip of the projection 111c is translatably moved in the direction parallel to direction D1 shown in FIGS. 6A to 6C, as shown in a locus M2. In the vibration mode shown in FIG. 6C, the tip of the projection 111c is translatably moved in direction D2 shown in FIGS. 6A to 6C as shown in a locus M3. If two vibration modes shown in FIGS. 6A and 6B are generated in a vibrator so as to have an appropriate phase difference, the tip of the projection 111c generates an elliptical motion as shown in a locus M1 in FIG. 6. If the elliptical motion is generated in a state in which the projection 111c of the vibrator 111 is press-contacted with the friction sliding surface 121a of the second member 12, a friction force is generated to thereby generate the driving force in direction D1 with respect to a friction driving surface 122a.

The above is the configuration of the vibration type motor 1. In the vibration type motor 1, the direction in which the first member 1 is sandwiched by the second member 12 and the third member 13 rotatably held with respect to the axis A1 and friction sliding surface 121a extends, the direction of the axis A1, and the direction in which the first member 11 drives the second member 12 are parallel.

FIGS. 2A to 2C are diagrams illustrating a force acting in the vibration type actuator of the first embodiment. FIG. 2A is a perspective view of the second member 12. The force acting on the second member 12 is represented as a vector. A first force F1, a reactive force F2, and forces F3 and F4 act on the second member 12. The first force F1 is generated by the pressing unit 14. The reactive force F2 is generated by press-contacting the projection 111c of the vibrator 111 with the friction sliding surface 121a. The forces F3 and F4 are forces for holding the convex portions 123a and 123b of the second member 12 by the holding units 131a and 131b of the third member 13.

FIG. 2B is a side view of the second member 12. If a distance from the A1 axis to a contact point of the projection 111c of the vibrator 111 and the friction sliding surface 121a of the second member 12 is L1, and the distance from the A1 axis to an acting point of the first force F1 is L2, the reactive force F2 is represented by the following formula 1 using F1, L1, and L2.

$$F=F1\times(L2/L1) \quad \text{(Formula 1)}$$

L2 and F1 are each constant because L2 is the distance between the A1 axis and the tension spring, which is the pressing unit 14, and F1 is a tensile force of the tension spring. Furthermore, the position of the contact point between the projection 111c of the vibrator 111 and the friction sliding surface 121a of the second member 12 is changed by the movement of the first member 11. However, since the moving direction of the first member 11 is parallel to the A1 axis, L1 is not changed even if the first member 11 moves. As described above, since F1, L1, and L2 are constant even if the first member 11 moves, the reactive force F2 is constant.

FIG. 2C is a diagram illustrating the variations of F1, F2, F3, and F4 when the first member moves. The position in D1 direction of the first member 11 is represented as "X", F1 is represented in a solid line, F2 is represented in a dashed line, F3 is represented in a dot-and-dash line, and F4 is represented in a two-dashed dotted line. When the first member 11 moves in the direction D1, F3 and F4 are changed and F2 is constant as described the above. Since the size of the reaction force F2 is same as the pressing force with which the projection 111c of the vibrator 111 and the friction sliding surface 121a are press-contacted, the pressing force with which the projection 111c and the friction sliding surface 121a are press-contacted is constant even if the first member 11 moves.

Since the second member comprising the friction member 121 is held by the third member 13 in the vibration type motor 1, the friction member 121 is not tilted. Furthermore, even when the first member 11 moves, the pressing force by which the projection 111c and the friction sliding surface 121a are press-contacted is constant regardless of the amount of movement. Therefore, the driving characteristic of the vibration type motor 1 is stable even when the vibrator 11 moves in the large stroke.

The scope of the present invention is not limited to the vibration type motor 1. The present invention is applicable, for example, to the shape of each member, the material, and the like of a vibration-type actuator that is different from that of the vibration type motor 1. Also, the vibration mode generated in the vibrator 111 is not limited to the vibration described with reference to FIGS. 6A to 6C.

Although the third member 13 comprises the guide portion 13b that movably holds the first member 11 only in the driving direction in the vibration type motor 1, the guide portion 13b is not required to be provided in the third member 13. For example, the guide portion 13b may be provided on a housing (not shown) on which the vibration type motor 1 is fixed. Note that, since the vibration-type motor 1 is large in size if the guide portion is provided on a member other than the third member 13, it is preferable that the third member 13 includes the guide portion.

Also, the vibration type motor 1 comprises the first member 11 comprising the power extraction unit 112a that extracts the power of the vibration type motor 1 in the vibration type motor 1. In this configuration, the first member 11 or the second member 12 is fixed on the housing (not shown), the power extraction unit 112a is connected to the object to be driven (not shown), and the object to be driven is driven by the movement of the first member 11. It is not necessary that the power extraction unit 112a is not provided in the first member 11. However, if the power extraction unit 112a is provided in the second member 12 or the third member 13, the first member 11 is fixed on the housing and the object to be driven is driven by the movement of the second member 12 and the third member 13. In this case, the second member 12, which is long in the driving direction, and the third member 13 occupy a large volume in the housing by moving. As described the above, it is preferable that the first member 11 includes the power extraction unit 112a.

Furthermore, the convex portions 123a and 123b are urged by the V groove-shaped holding units 131a and 131b in the vibration-type motor 1 to thereby relatively rotatably hold the second member 12 with respect to the A1 axis by the third member 13. However, the V groove-shaped holding units 131a and 131b do not need to have the V-shaped groove. For example, a hole may be provided on the holding units 131a and 131b and the axis of the convex portions 123a and 123b is fit into the hole to thereby obtain the effect of the present invention.

In addition, in the vibration type motor 1, when the first member 11 is sandwiched between the second member 12 and the third member 13 by the first force F1, the convex portions 123a and 123b are held by the holding units 131a and 131b by the forces F3 and F4. The convex portions 123a and 123b and the holding units 131a and 131b are urged by the forces F3 and F4. At this time, the second member 12 stably press-contacts the projection 111c of the vibrator 111 with the friction sliding surface 121a without the backlash in the direction D2 shown in FIGS. 2A to 2C. As described the above, it is preferable to relatively rotatably hold the third member 13 with respect to the A1 axis by urging the convex portions 123a and 123b to the holding units 131a and 131b.

FIG. 7 is a diagram viewed from an optical axis direction of a lens of the lens driving device comprising the vibration type motor. A lens driving device 9 comprises a lens 91, lens holder 92, two guide members 93, a housing 94, and the vibration type motor 1. The lens 91 is, for example, a focus lens used for a lens barrel of a camera, and adjusts a focal position of an optical system by moving in an optical axis A2 direction. The lens holder 92 holds the lens 91 and comprises a round hole 92a and an elongated hole 92b passing through in the optical axis A2 direction. The two guide members 93 are, for example, a cylindrical guide bar, extend in the direction parallel to the optical axis A2 direction, and both ends thereof are fixed to the housing 94. The guide members 93 are fitted into the round hole 92a and the elongated hole 92b of the lens holder 92, respectively, and movably hold the lens holder 92 and the lens 91 only in the optical axis A2 direction.

In the vibration type motor 1, the third member 13 is fixed on the housing 94 and the driving direction of the motor is arranged so as to be parallel to the optical axis A2. The power extraction unit 112a of the vibration type motor 1 is connected to the lens holder 92. If the vibration type motor 1 is driven, the first member 11 of the vibration type motor 1 is driven in the optical axis A2 direction, and the lens 91 and the lens holder 92, which are connected via the first member 11 and the power extraction unit 112a, are driven in the optical axis A2 direction.

A description will be given of the action and the effect of the lens driving device 9. In the lens driving device 9, the vibration type motor 1 is used for the driving of the lens 91. Since the vibration 1 ensures stable driving characteristics even with the large stroke amount, the vibration type motor 1 can drive the lens 91 and the lens holder 92 with the large stroke amount.

Second Embodiment

FIGS. 3A to 3C are diagrams illustrating the configuration of a vibration type actuator according to the second embodiment. A vibration type motor 2 shown in FIGS. 3A to 3C is an ultrasonic motor that is the vibration type actuator having the vibrator that ultrasonic-vibrates by applying a high frequency voltage. Of course, the applicable scope of the present invention is not limited to an ultrasonic motor. Furthermore, the present invention is applicable to a lens driving device comprising the vibration type motor 2.

FIG. 3A illustrates the state viewed from the driving direction (direction D1 shown in FIGS. 3A to 3C) of the vibration type motor 2. FIG. 3B illustrates the state viewed from the side of the driving direction of the vibration type motor 2. FIG. 3C illustrates the state viewed in the direction indicated by an arrow P shown in FIG. 3B. The vibration type motor 2 comprises a first member 21, a second member 22, a third member 23, and a pressing unit 24.

The first member 21 comprises a vibrator 211, a vibrator holding unit 212, a connecting unit 213, and a vibrator receiving unit 214. The vibrator 211 comprises a piezoelectric element 211a, a metal plate 211b, and a projection 211c. The vibrator holding unit 212 comprises a power extraction unit 212a which extracts the power of the vibration type motor 2.

The second member 22 comprises a friction member 221 and a friction member holding member 222. The friction member 221 comprises a friction sliding surface 221a. Convex portions 223a and 223b are provided on the friction member holding member 222. Holding units 231a and 231b are provided on the third member 23. Since the detail of each member is the same as in the first embodiment, it is omitted. In addition, the third member 23 relatively rotatably holds the second member 22 with respect to the axis A1 by urging the convex portions 223a and 223b of the second member 22 toward the holding units 231a and 231b of the second member 22.

The first member 21 is movably guided only in the D1 direction shown in FIGS. 3A to 3C toward the third member 23 by a guide portion 23b provided on the third member 23, a guided portion 212b provided on the first member 21, and a rolling ball 25.

The vibration type motor 2 comprises the tension spring serving as the pressing unit 24 that causes a first force (F1a shown in FIGS. 3A to 3C) for rotating the second member 22 with respect to the third member 23 with respect to the axis A1. The tension spring which is the pressing unit 24 is diagonally hooked as shown in FIG. 3B, and generates the force (F1b shown in FIGS. 3A to 3C) in addition to the first force F1a. The force in the direction D1 urges the second member 22 toward the third member 23 in the direction D1, which is the driving direction of the motor. Hereinafter, the force for urging the second member 22 toward the third member 23 in the driving direction (that is, the direction in which the second member 22 extends) is referred to as a second force.

In a similar manner to the first embodiment, the first force F1a press-contacts the projection 211c of the vibration 211 with the friction sliding surface 221a of the second member 22 by rotating the second member 12 with respect to the axis A1. If the vibration 211 vibrates in this case, the driving force is generated based on the principle described the above, and the first member 21 is driven to the second member 22 in the direction D1 shown in FIGS. 3A to 3C. Furthermore, the second force F1b generates a coupling of forces between the second member 22 and the third member 23 shown in F5 of FIGS. 3A to 3C.

A description will be given of the shape of the holding unit of the third member with reference to FIGS. 5A to 5D. The holding units 231a and 231b include a first surface S1 and a second surface S2, respectively, and each surface is formed with a predetermined angle. The action of the first surface S1 and the second surface S2 will be described later. The first surface S1 and the second surface S2 are brought into contact with the convex portions 223a and 223b, and thereby the convex portions 223a and 223b and the holding units 231a and 231b are arranged in a defined position.

The above is the configuration of the vibration type motor 2. In the vibration type motor 2, the first member 21 is sandwiched by the second member 22 and the third member 23 rotatably held with respect to the axis A1, in a manner similar to the vibration type motor 1. Then, the direction in which the friction sliding surface 221a extends, the axis A1 direction, and the direction in which the first member 21 is driven toward the second member 22 are substantially parallel. Furthermore, in the vibration motor 2, the pressing unit 24 generates the second force F1b in addition to the first force F1a, and the second force F1b generates the coupling of forces F5 between the second member 22 and the third member 23.

FIGS. 4A to 4C are diagrams illustrating the force acting in the vibration type actuator of the second embodiment. FIG. 4A is a perspective view of the second member 22. The force acting on the second member 22 is represented as a vector. The first force F1a, the second force F1b, a reactive force F2, and forces F3 and F4 act on the second member 22. The first force F1a and the second force F1b are generated by the pressing unit 24. The reactive force F2 is generated by press-contacting the projection 211c of the vibrator 211 with the friction sliding surface 221a. The forces F3 and F4 are forces for holding the convex portions 223a and 223b of the second member 22 by the holding units 231a and 231b of the third member 23, and are also the urging forces toward a convex portion 222a of the holding units 231a and 231b.

F3 and F4 can each be decomposed into F3a, F3b, F4a, and F4b. F3a and F4a are the urging forces generated when the first member 21 is sandwiched between the second member 22 and the third member 23. F3$b$ and F4$b$ are the urging forces that the holding units 231$a$ and 231$b$ apply to the convex portions 223$a$ and 223$b$ for preventing the rotation of the second member 22 by the coupling of forces (the force F5 shown in FIGS. 4A to 4C) generated by the second force F1$b$. Hereinafter, the urging forces F3$a$ and F4$a$ generated when the first member 21 is sandwiched between the second member 22 and the third member 23 are referred to as a first urging force. Furthermore, the urging forces F3$b$ and F4$b$ by the coupling of force F5 are referred to as a second urging force.

FIG. 4B is a side view of the second member 22. In a manner similar to the first embodiment, the reactive force F2 is represented by the following formula 1 using F1, L1, and L2.

$$F = F1 \times (L2/L1) \qquad \text{(Formula 1)}$$

L2 and F1 are constant. In addition, since the movement direction of the first member 21 is parallel to the axis A1, L1 is not changed even if the first member 21 moves. As described the above, since F1, L1, and L2 are constant even if the first member 21 moves, the reactive force F2 is constant. Since the reactive force F2 is constant even if the first member 21 moves, the pressing force for press-contacting the projection 211$c$ with the friction sliding surface 221$a$ is also constant even if the first member 21 moves. Furthermore, since the second force F1$b$ is constant, the second urging forces F3$b$ and F4$b$ are constant due to the coupling of force F5 generated by the second force F1$b$.

FIG. 4C is a diagram illustrating the variations of F1, F2, F3, and F4 when the first member moves. The position in direction D1 of the first member 21 is represented as "X", F1 is represented in a solid line, F2 is represented in a dashed line, F3 is represented in a dot-and-dash line, and F4 is represented in a dashed-two dotted line. In a manner similar to the first embodiment, F1 and F2 are constant. Although the urging forces F3 and F4 of the holding units 231$a$ and 231$b$ of the third member 23 and the convex portions 223$a$ and 223$b$ of the second member 22 are changed, the urging forces F3 and F4 are always constant or greater because the second urging forces F3$b$ and F4$b$ are constant. Furthermore, if the first member 21 moves, the ratio of the first urging forces F3$a$ and F4$a$ and the second urging forces F3$b$ and F4$b$ is changed to thereby change the direction of the urging forces F3 and F4.

FIGS. 5A to 5D are diagrams illustrating the holding of a convex portion of a second member by a third member holding unit in a case where the urging forces F3 and F4 are changed. FIGS. 5A and 5B are enlarged views of the convex portion 223$a$ and the holding unit 231$a$ in the case where the first member 21 moves to one of the driven ends (negative X-direction end). FIGS. 5C and 5D are enlarged views of the convex portion 223$b$ and the holding unit 231$b$ in the case where the first member 21 moves to the other of the driven ends (positive X-direction end). The direction of F3 in FIG. 5A is referred to as a first direction (D4 direction shown in FIG. 5A). Furthermore, the direction of F3 in FIG. 5C is referred to as a second direction (D5 shown in FIG. 5C). In addition, the normal line of the first surface S1 and the second surface S2 of the holding unit 231$a$ are set to N1 and N2.

If the urging force F3 for urging the holding unit 231$a$ to the convex portion 223$a$ faces the outside of the angle formed by the normal line N1 and the normal line N2, the convex portion 223$a$ slips in a direction disengaged from the holding unit 231$a$ on the first surface S1 or the second surface S2, and thereby the convex portion 223$a$ is separated from the holding unit 231$a$. In the vibration type motor 2, the angle (Θ1 shown in FIGS. 5A and 5C) formed by the first direction with respect to the normal line N1 and the angle (Θ2 shown in FIGS. 5A and 5C) formed by the second direction with respect to the normal line N1 are smaller than the angle (Θ3 shown in FIGS. 5A and 5C) formed by the normal line N2 with respect to the normal line N1. Therefore, even if the urging force F3 is changed, the holding unit 231$a$ and the convex portion 223$a$ are urged by the first surface S1 and the second surface S2 without separating.

The direction of F4 in FIG. 5B is referred to as a first direction (D4 direction shown in FIG. 5B). The direction of F4 in FIG. 5D is referred to as a first direction (D5 direction shown in FIG. 5D). The normal line of the first surface S1 and the second surface S2 of the holding unit 231$b$ are set to N1 and N2. The angle Θ1 formed by the first direction with respect to the normal line N1 and the angle Θ2 formed by the second direction with respect to the normal line N1 are smaller than the angle Θ3 formed by the normal line N2 with respect to the normal line N1. Even if the urging force F4 is changed, the holding unit 231$b$ and the convex portion 223$b$ are urged by the first surface S1 and the second surface S2 without separating.

The driving characteristic of the vibration type motor 2 as described above is stable even if the vibrator moves in the large stroke amount. Note that the shape of each member and the material of the vibration type motor 2 are not limited to the same as those of the vibration type motor 1. Also, the vibration mode generated in the vibrator 211 is not limited to the vibration described with reference to FIGS. 6A to 6C.

In addition to the first force F1$a$, the pressing unit 24 provided with the vibration type motor 2 generates the second force F1$b$ for urging the second member 22 in the driving direction with respect to the third member 23. Therefore, the backlash in the driving direction (direction D1 shown in FIGS. 4A to 4C) of the motor of the second member 22 and the third member 23 can be removed without increasing the parts.

Furthermore, in addition to the second force F1$b$, the coupling of force F5 is generated between the second member 22 and the third member 23 in the vibration type motor 2. Then, the convex portions 223$a$ and 223$b$ and the holding units 231$a$ and 231$b$ are urged by the urging forces F3 and F4 that are the resultant forces of the first urging forces F3$a$ and F4$a$ and the second urging forces F3$b$ and F4$b$. The second urging forces F3$b$ and F4$b$ are constant, and thus F3 and F4 can always obtain a constant or greater urging force even if the first member moves. Therefore, even if the first member moves in the large stroke amount, the projection 111$c$ of the vibrator 111 of the vibration 211 can be press-contacted with the friction sliding surface 121$a$ without the backlash in the D2 direction shown in FIGS. 4A to 4C.

Furthermore, in the vibration type motor 2, the angle Θ1 formed by the first direction D4 with respect to the normal line N1 and the angle Θ2 formed by the second direction D5 with respect to the normal line N1 are equal to or less than the angle Θ3 formed by the normal line N2 with respect to the normal line N1. Therefore, even if the urging forces F3 and F4 of the convex portions 223$a$ and 223$b$ and the holding units 231$a$ and 231$b$ are changed, the convex portions 223$a$ and 223$b$ and the holding units 231$a$ and 231$b$ are not separated.

Note that, although the guide portion 23$b$ is not required to be provided on the third member 23, it is preferable that the third member 23 includes the guide portion 23$b$. Furthermore, although power extraction unit 212a does not need to be provided on the first member 21, it is preferable that the first member 21 include the power extraction unit 212a in a manner similar to the first embodiment. In addition, the holding units 231a and 231b are not required to have the V groove-shape in a manner similar to the first embodiment. Note that the action and the effect of the lens driving device using the vibration type motor 2 are similar to the first embodiment.

While the embodiments of the invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-122190 filed Jun. 17, 2015, which is hereby incorporated by reference herein in its entirety.

The invention claimed is:

1. A vibration type actuator comprising:
a first member that has a vibrator;
a second member that extends in a predetermined direction and has a friction sliding surface against which the vibrator is press-contacted;
a third member that rotatably holds the second member with respect to an axis parallel to the predetermined direction; and
a pressing unit that generates a first force for rotating the second member with respect to the axis relative to the third member,
wherein the first member is sandwiched between the second member and the third member by the first force, and
wherein the first member is driven in a driving direction parallel to the predetermined direction relative to the second member by the vibration of the vibrator.

2. The vibration type actuator according to claim 1, wherein the third member comprises a guide unit that movably holds the first member in the driving direction.

3. The vibration type actuator according to claim 1, wherein the first member comprises a power extraction unit that extracts the power of the vibration type actuator.

4. The vibration type actuator according to claim 1, wherein a convex portion is provided at one of the second member and the third member, and a holding unit that holds the convex portion is provided at the other, and
wherein the third member relatively rotatably holds the second member with respect to the axis by urging the convex portion and the holding unit.

5. The vibration type actuator according to claim 1, wherein the pressing unit further generates a second force for biasing the second member in the predetermined direction relative to the third member.

6. The vibration type actuator according to claim 5, wherein a convex portion is provided at one of the second member and the third member, and a holding unit that holds the convex portion is provided at the other,
wherein the third member relatively rotatably holds the second member with respect to the axis by urging the convex portion and the holding unit,
wherein the second force causes a coupling of forces between the second member and the third member, and
wherein the convex portion and the holding unit are urged by a resultant force of a first urging force, which is caused when the first member is sandwiched between the second member and the third member by the first force, and a second urging force by the coupling of the forces.

7. The vibration type actuator according to claim 6, wherein the holding unit includes a first surface and a second surface contacted with the convex portion, and
wherein, if a normal line of the first surface is a first normal line, a normal line of the second surface is a second normal line, a direction of the resultant force, in which the first member moves to one driving end, is a first direction, and the direction of the resultant force, in which the first member moves to the other driving end, is a second direction, an angle formed by the first direction and the second direction relative to the first normal line is less than the angle formed by the second normal line relative to the first normal line.

8. A lens driving device comprising:
the vibration type actuator according to claim 1.

9. An ultrasonic motor comprising:
the vibration type actuator according to claim 1,
wherein the vibrator is ultrasonically vibrated by a voltage being applied.

* * * * *